United States Patent
Mori

[11] 3,903,437
[45] Sept. 2, 1975

[54] LINEAR MOTOR WINDING AND METHOD OF FABRICATING THE SAME

[76] Inventor: Keiichi Mori, 5-24 Minamimachi-1-chome, Tanashi, Tokyo, Japan

[22] Filed: Apr. 1, 1974

[21] Appl. No.: 456,771

[30] Foreign Application Priority Data
Apr. 3, 1973 Japan.................................. 48-37420

[52] U.S. Cl. .................................................. 310/12
[51] Int. Cl.² ........................................ H02K 41/02
[58] Field of Search.......... 310/12, 13, 14, 203–207; 336/200, 206; 29/205 R, 205 D, 605

[56] References Cited
UNITED STATES PATENTS

| | | |
|---|---|---|
| 3,144,570 | 8/1964 | Crowley................................ 310/13 |
| 3,560,904 | 2/1971 | Wilkes................................ 29/605 X |
| 3,587,019 | 6/1971 | Bull et al. ............................ 336/200 |
| 3,726,004 | 4/1973 | Holland et al. ...................... 336/200 |
| 3,809,937 | 5/1974 | Koike............................. 310/205 X |

*Primary Examiner*—R. N. Envall, Jr.
*Attorney, Agent, or Firm*—Karl W. Flocks

[57] ABSTRACT

A plurality of conductor loops to constitute the coils of a winding are disposed in a plane, to form a flat loop assembly and the flat loop assembly is rolled about a specific axis to form a cylindrical winding for use in a linear motor.

6 Claims, 21 Drawing Figures

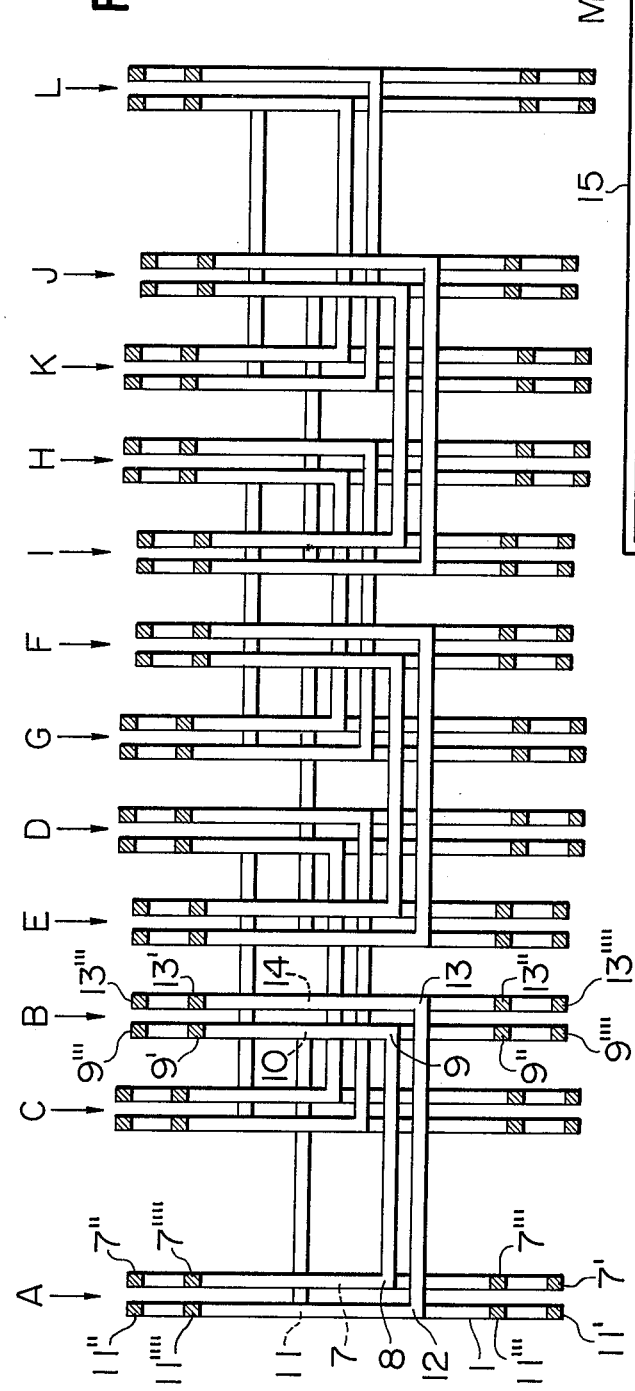

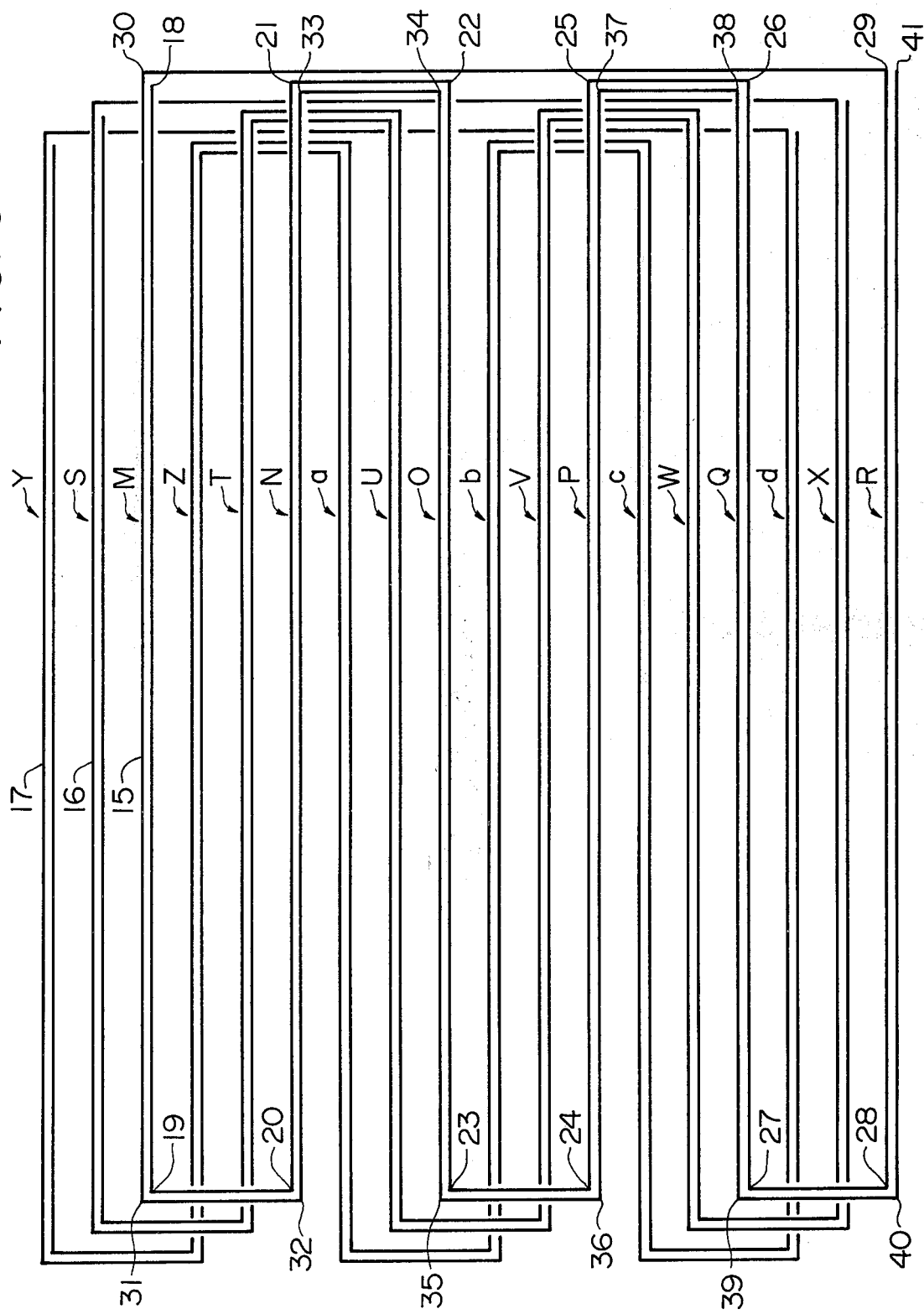

LINEAR MOTOR WINDING AND METHOD OF FABRICATING THE SAME

BACKGROUND OF THE INVENTION

1. Field of the Invention

The present invention relates to a novel structure of a winding for a linear motor, and to a method of fabricating the winding.

2. Description of the Prior Art

The winding of a conventional linear motor consists of coils each of which is wound with loops of a conductor wire, which are arranged on the same axis to form a cylindrical coil assembly and which are electrically connected with one another, as shown in FIG. 1. Accordingly, the structure and the method of fabrication, of the winding have needed many steps of fabrication and there were the drawbacks of poor productivity, high production cost and poor fixation of loops of each coil one to another.

SUMMARY OF THE INVENTION

The object of the present invention is to provide a winding for a linear motor and a method of fabricating the winding which is free from such drawbacks as mentioned above.

To attain the object, the winding of a linear motor according to the present invention comprises a roll of substantially identical layers of multi-turned loops of a continuous conductor disposed in a plane, each of the loops in the respective layers having a contour including a plurality of long straight parts disposed in mutually parallel and spaced relationship and interconnected at the ends thereof so as to complete the loop, and the loops overlapping in such a manner that the long parts of loops on one layer are laterally displaced from the corresponding parts of loops on other layers.

According to the present invention, a plurality of coils to form a winding of a linear motor are simultaneously shaped and one coil is rigidly fixed to another so that the integral winding is very stable against mechanical force. Thus, there are needed fewer steps of fabrication, the productivity increases, the production cost is lowered, and automatic massproduction proves suitable for the method.

BRIEF DESCRIPTION OF THE DRAWING

FIG. 7 is a cross section of the winding shown in FIG. 6.

FIG. 8 shows another example of the structure of the conductor loops used in the winding according to the present invention.

FIG. 9 shows an arrangement of the conductor loops shown in FIG. 8, according to the present invention.

DESCRIPTION OF THE PREFERRED EMBODIMENTS

Figure 1:
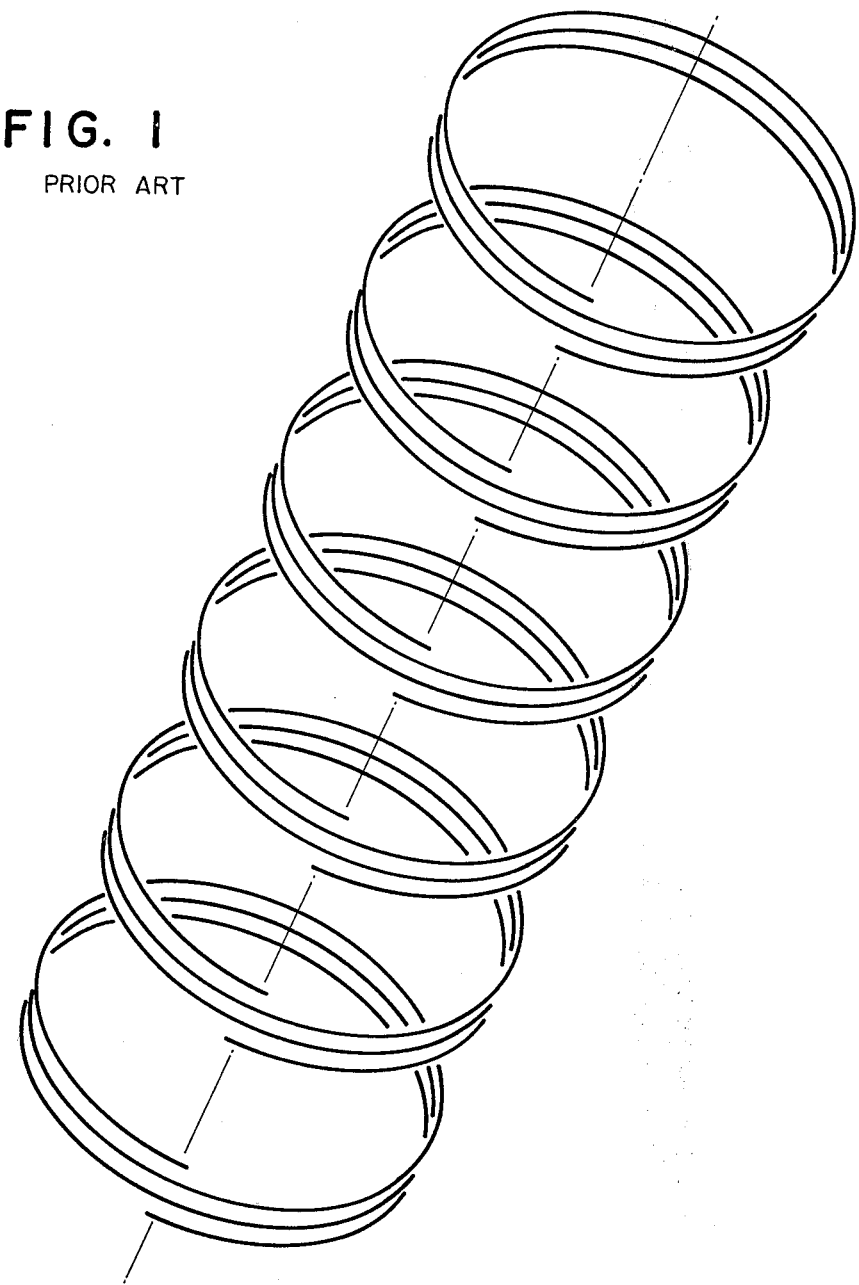
FIG. 1 is a perspective view of the winding of a conventional linear motor.
Figure 2:
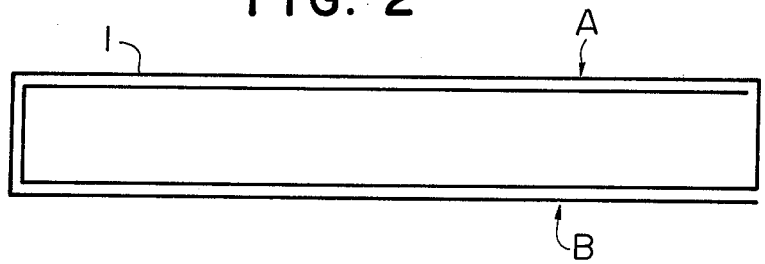
FIG. 2 shows an example of the shape of the conductor loops used in the winding according to the present invention.
Figure 3:
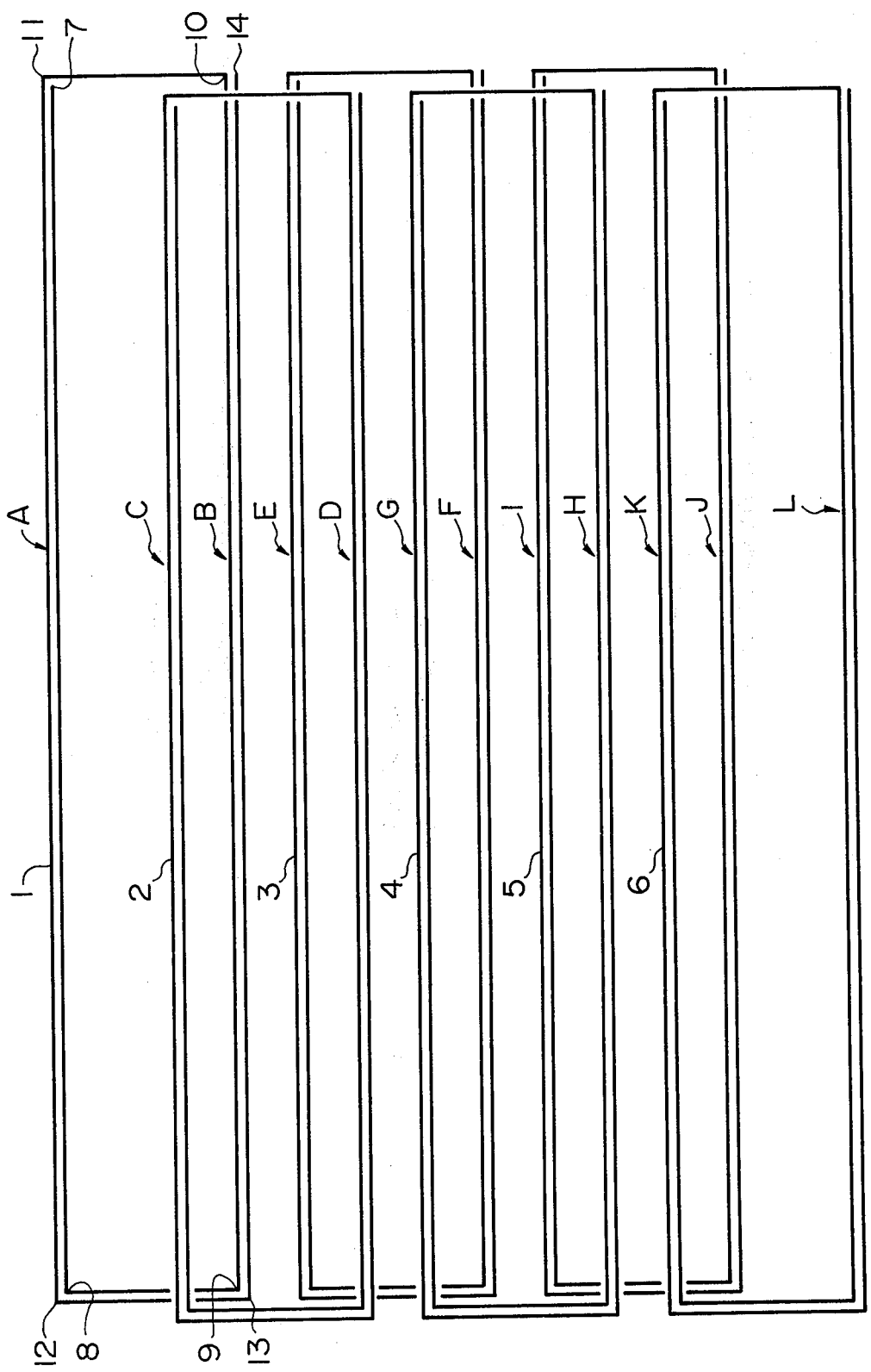
FIG. 3 shows an arrangement of the conductor loops shown in FIG. 2, according to the present invention.

The present invention will now be described with the aid of the attached drawings. As shown in FIG. 2, a conductor loop has two turns of conductor wire 1 and it also has two long straight parts, for example, A and B disposed parallel to each other in a plane. The conductor wire may be coated for the purpose of insulation, if necessary, in all the embodiments. In FIG. 3, identical loops 1 ~ 6, each being similar to that shown in FIG. 2, are disposed in such a manner that a pair of loop assemblies, each consisting of three loops arranged in a plane equidistantly apart from each other, are placed one on the other with a displacement between the pair in the direction perpendicular to the long parts. With this arrangement, as shown in FIG. 3, a long part of a loop and a long part of another loop in one loop assembly are located between the two long parts of each loop in the other loop assembly. The electrical connection of the ends of the loops disposed as shown in FIG. 3 may be performed any time during the process of fabricating a winding according to the present invention. For example, in case of three-phase connection, the ends of the loops are connected in delta or star configuration so that each loop may form a circuit for one of the three phases.

Figure 4:
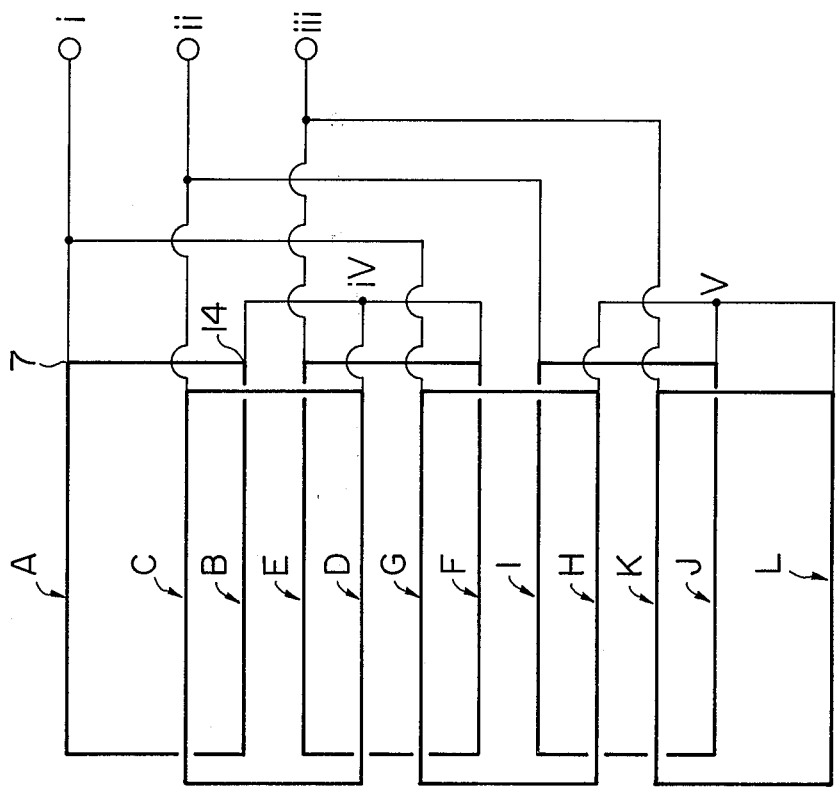

FIG. 4 shows an inter-loop connection with which the loops disposed as shown in FIG. 3 are connected in parallel star connection. In FIG. 4, the turns of each loop are shown as represented by a single thick line. The circuit for the phase *i* of the three phases consists of a path from an external terminal *i* to a neutral point *iv* via the end 7 of a loop, parallel long parts A and B, and the end 14 of the loop and a path from the terminal *i* to a neutral point *v* via the long parts G and H. The circuit for the phase *ii* consists of a path from an external terminal *ii* to the neutral point *iv* via long parts C and D and a path from the terminal *ii* to the neutral point *v* via long parts I and J. The circuit for the phase *iii* consists of a path from an external terminal *iii* to the neutral point *iv* via long parts E and F and a path from the terminal *iii* to the neutral point *v* via long parts K and L. Namely, in FIG. 4, two star-connected circuits are connected in parallel with each other.

Figure 5:
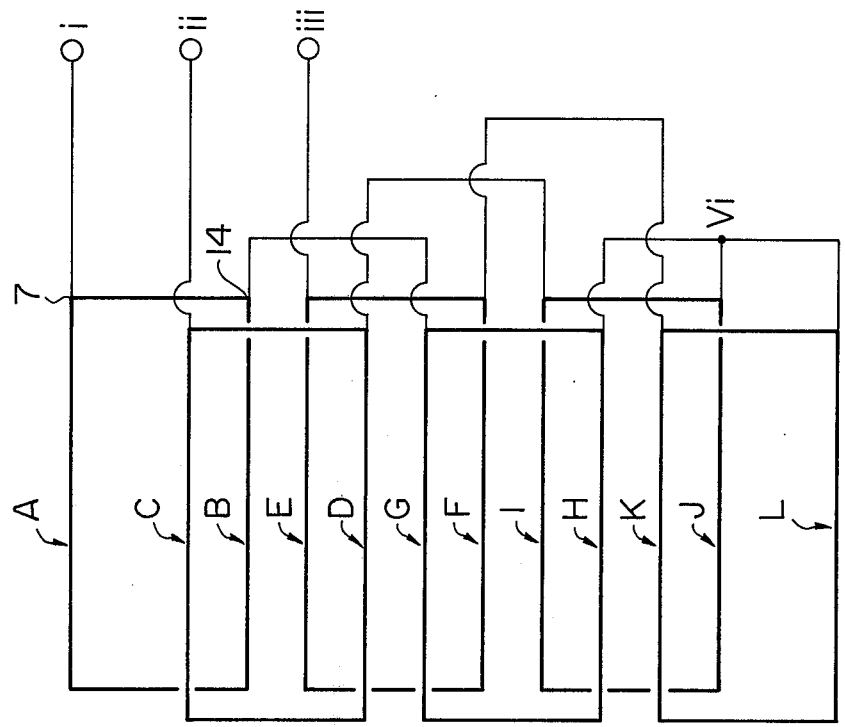
FIG. 4 and FIG. 5 show how the conductor loops disposed as shown in FIG. 3 are electrically connected with one another.

FIG. 5 shows an inter-loop connection with which the loops disposed as shown in FIG. 3 are connected in series star connection. Also, in FIG. 5, the turns of each loop are shown as represented by a single thick line. The circuit for the phase *i* is a path from an external terminal *i* to a neutral point *vi* via the end 7 of a loop, long parts A and B, the end 14 of the loop, and long parts G and H. The circuit for the phase *ii* is a path from an external terminal *ii* to the neutral point *vi* via long parts C, D, I and J. The circuit for the phase *iii* is a path from an external terminal *iii* to the neutral point *vi* via long parts E, F, K and L. Namely, in FIG. 5, the circuit for each phase of the star-connected winding consists of two loops connected in series.

Figure 6:
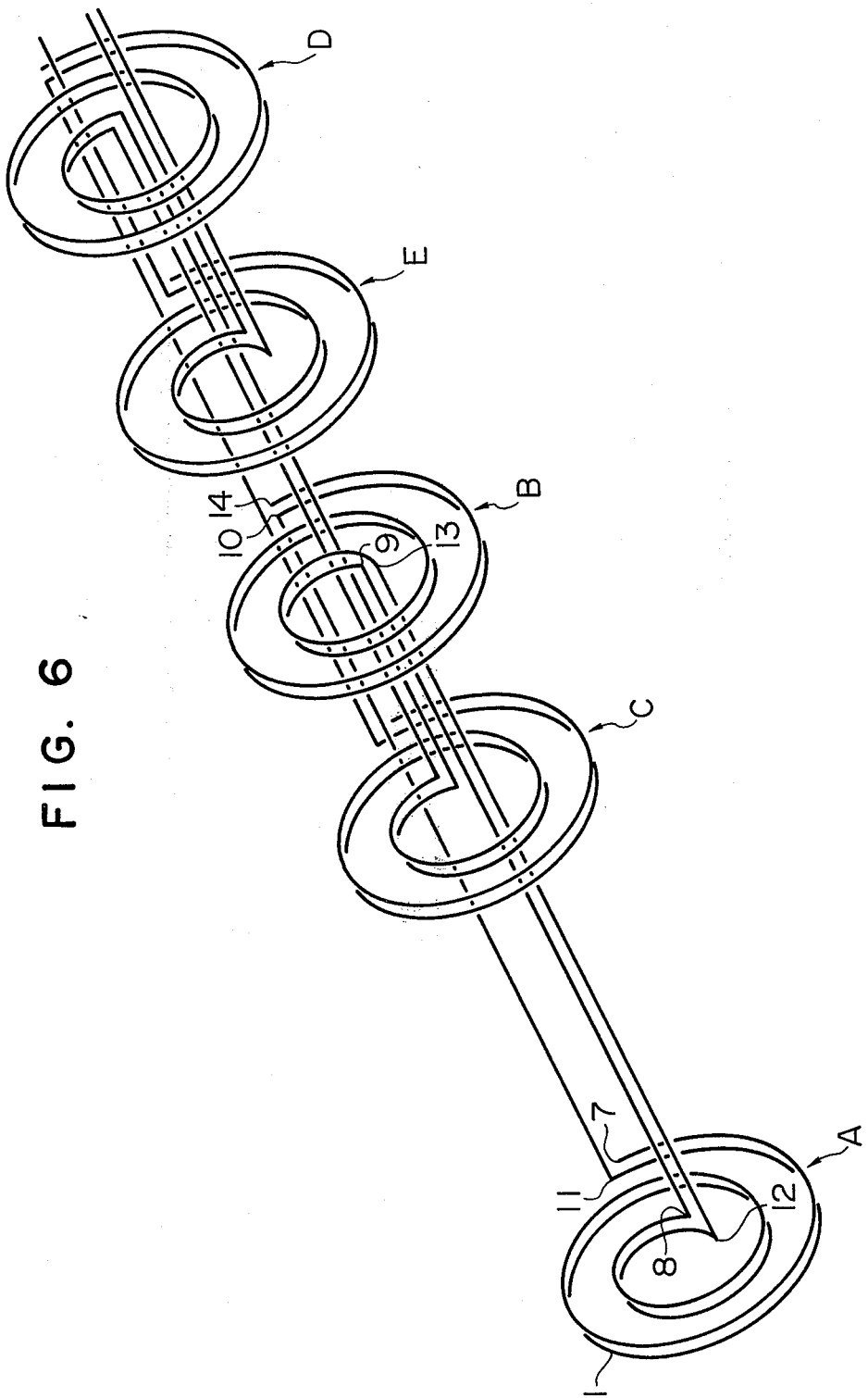
FIG. 6 is a perspective view of a part of the winding according to the present invention, formed of the conductor loops disposed as shown in FIG. 3.

Then, the conductor loops disposed as shown in FIG. 3 are rolled twice from the left end (in FIG. 3) about an axis parallel to the plane containing the conductor loops and substantially perpendicular to the long parts so that a winding for a linear motor is obtained which is partially shown in perspective view in FIG. 6, with inter-loop wirings omitted.

In this way, each long part of every conductor loop forms a coil, as shown in FIG. 6 and the reference numerals and characters applied to the long parts of the loops and the associated coils in the following description will be made the same.

In FIG. 6, among the coils formed by rolling the conductor loops, the coils A and B are taken for example to describe the electrical wiring of the winding. In the coil A, the conductor wire 1 is coiled twice, beginning at the end 7 and terminating at the end 8, and it is drawn to the coil B and coiled twice, beginning at the end 9 and terminating at the end 10. Then, the conductor wire is drawn back to the coil A and coiled twice, beginning at the end 11 and terminating at the end 12, and it is again drawn to the coil B and coiled twice, beginning at the end 13 and terminating at the end 14. The other coils are similarly wired and reference to FIG. 6 will make it possible for those skilled in the art to grasp the full picture of the electrical wiring of the overall winding. In FIGS. 3 and 6, the same reference numerals and characters are applied to like parts or elements. Some of them are used only for the purpose of facility in comparison and are not referred to in the description. This way of representation will be employed also in the other figures.

FIG. 7 is a longitudinal cross section of the winding with inter-loop connections omitted. In FIG. 7, the lead lines associated with the reference numerals applied to the hidden portions are broken ones and the same is true for the other figures. As shown in FIG. 6 and also in FIG. 7, the conductor wire 1 is coiled twice, beginning at the end 7 of the coil A, following a path 7'-7''-7'''-7'''' and terminating at the end 8, and it is then drawn to the coil B and coiled twice, beginning at the end 9, following a path 9'-9''-9'''-9'''' and terminating at the end 10. Then, the conductor wire 1 is drawn back to the coil A and coiled twice, beginning at the end 11, following a path 11'-11''-11'''-11'''' and terminating at the end 12, and finally it is again drawn to the coil B and coiled twice, beginning at the end 13, following a path 13'-13''-13'''-13'''' and terminating at the end 14. The other coils are similarly wired.

Next, the case where inter-loop connections are performed after the assembly of the loops disposed in a plane has been rolled up, will be described. As an embodiment of this case, the manner of connecting in star the loops disposed as shown in FIG. 7 will be clear from comparison with the connections shown in FIGS. 4 and 5. Namely, it will be easily imagined by making the coils A to L correspond to the long parts A to L in FIGS. 4 and 5, that is, by substituting the long parts A to L in FIGS. 4 and 5 for the coils A to L in FIG. 7. Further, the inter-loop connections will be omitted in the following embodiments. The windings shown in FIGS. 6 and 7 are of alternate winding.

FIG. 8 shows another example of the loop. This loop of a single conductor wire 15 is formed by winding the wire 15 along a contour having six long straight parts M, N, O, P, Q and R which are parallel to one another. In this example, it is seen that the wire is wound twice along the contour. Three of such loops are placed one on another in such a positional relation as that one is displaced from another in the direction orthogonal to the long parts, as shown in FIG. 9. Namely, the arrangement of three loops, if it is seen from above, is such that a long part of the second loop and the corresponding long part of the third loop are located between two adjacent long parts of the first loop. Then the assembly of the loops is rolled twice from the left end (in FIG. 9) about an axis parallel to the plane containing the assembly and substantially perpendicular to the long parts so that a winding for a linear motor can be obtained which is shown in longitudinal cross section in FIG. 10 with inter-loop connections omitted.

Figure 10:
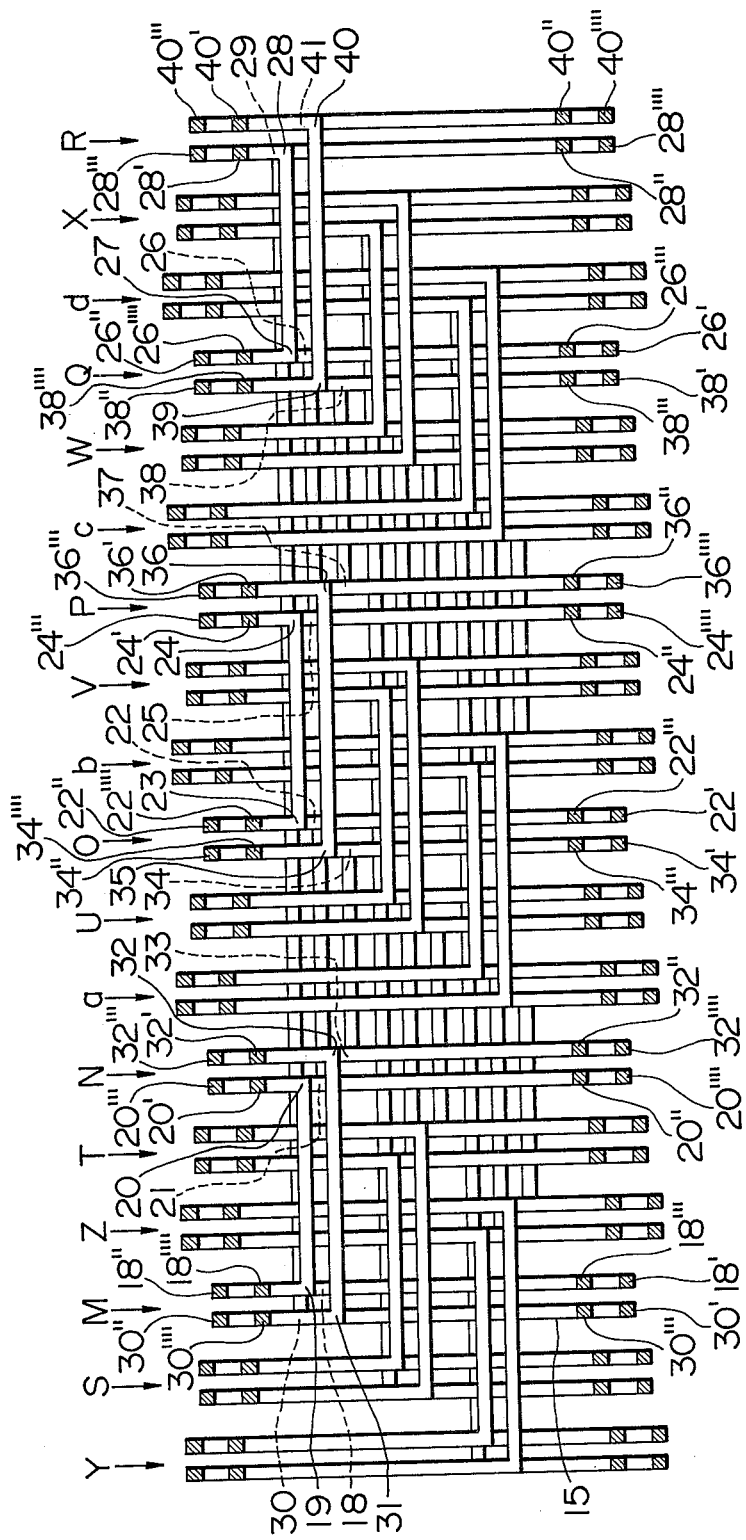
FIG. 10 is a cross section of the winding according to the present invention, formed of the conductor loops disposed as shown in FIG. 9.

In FIG. 10, the conductor wire 15 is coiled twice, beginning at the end 18 of the coil M, following a path 18'-18''-18'''-18'''' and terminating at the end 19, and it is drawn to the coil N and coiled twice, beginning at the end 20, following a path 20'-20''-20'''-20'''' and terminating at the end 21. The conductor wire 15 is then drawn to the coil O and coiled twice, beginning at the end 22, following a path 22'-22''-22'''-22'''' and terminating at the end 23. The conductor wire 15 is further drawn to the coil P and coiled twice from the end 24 via a path 24'-24''-20'''-20'''' to the end 25; drawn to the coil Q and coiled twice from the end 26 via a path 26'-26''-26'''-26'''' to the end 27; and drawn to the coil R and coiled twice from the end 28 via a path 28'-28''-28'''-28'''' to the end 29. Then, the conductor wire 15 is drawn back to the coil M and coiled twice from the end 30 via a path 30'-30''-30'''-30'''' to the end 31; drawn again to the coil N and coiled twice from the end 32 via a path 32'-32''-32'''-32'''' to the end 33; drawn to the coil O and coiled twice from the end 34 via a path 34'-34''-34'''-34'''' to the end 35; drawn to the coil P and coiled twice from the end 36 via a path 36'-36''-36'''-36'''' to the end 37; drawn to the coil Q and coiled twice from the end 38 via a path 38'-38''-38'''-38'''' to the end 39; and drawn to the coil R and coiled twice from the end 40 via a path 40'-40''-40'''-40'''' to the end 41. The other coils are similarly wired, too. In this way, a continuous conductor wire is repeatedly coiled to form a unit of six coils connected in series. The winding of a linear motor shown in FIG. 10 is of alternate wave winding.

Figure 11:
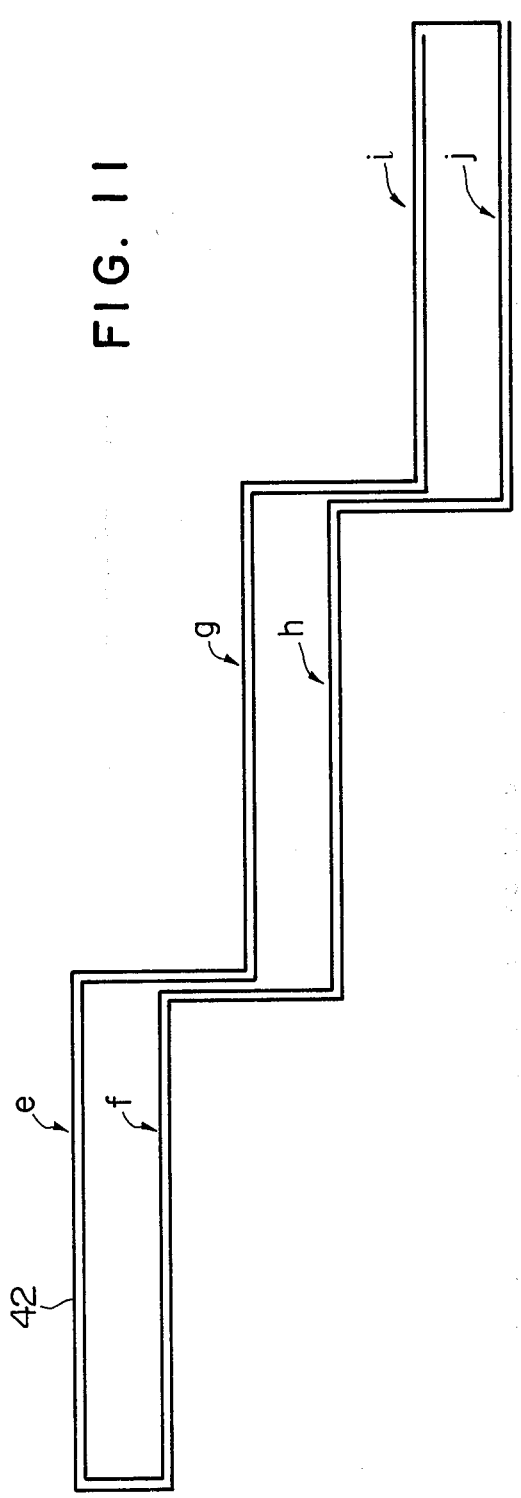
FIG. 11 shows a third example of the structure of the conductor loops used in the winding according to the present invention.
Figure 12:
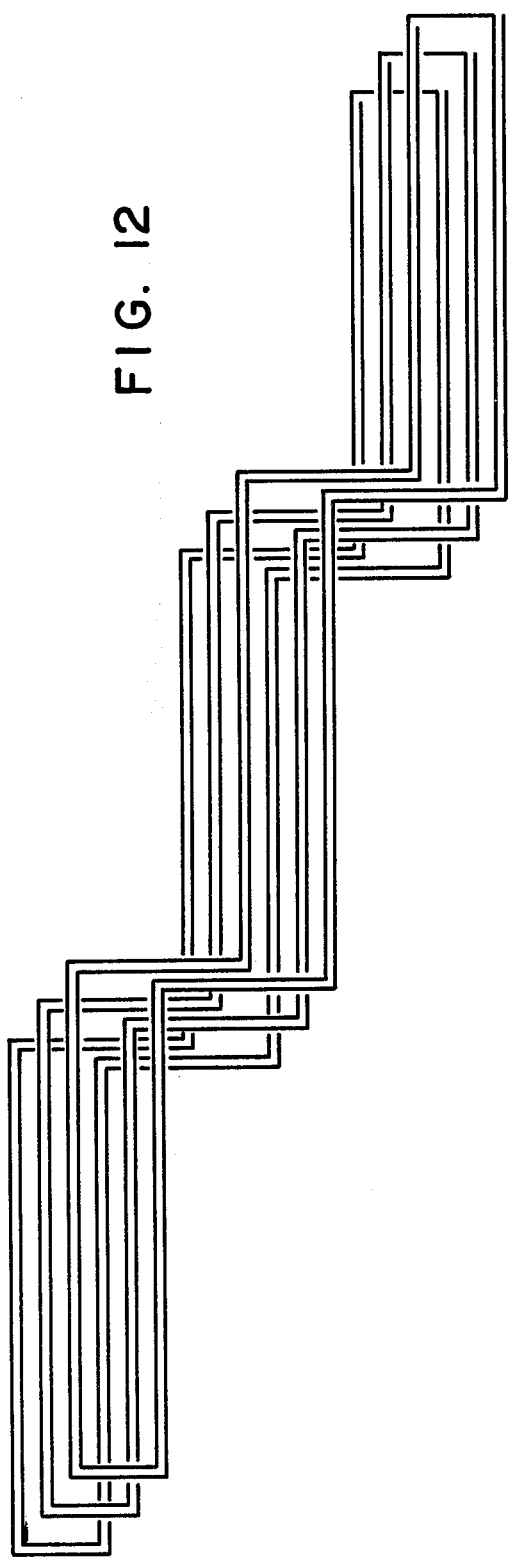
FIG. 12 shows an arrangement of the conductor loops shown in FIG. 11, according to the present invention.

FIG. 11 shows another example of the structure of a loop according to the present invention, in which long parts *e* and *f*, *g* and *h*, and *i* and *j* are respectively parallel to each other and in which a continuous conductor wire 42 is wound twice. Three such loops are overlapped, displaced from one another in the direction perpendicular to the long parts, as shown in FIG. 12. Namely, a long part of one loop and a long part of another loop are located between the two long parts of each loop, all the long parts being disposed parallel to one another. Then, the assembly of the three loops arranged in a plane is rolled from the left end (in FIG. 12) about an axis parallel to the plane and substantially perpendicular to the long parts so that a linear motor winding similar in structure to that shown in FIG. 10 is obtained.

Figure 13:
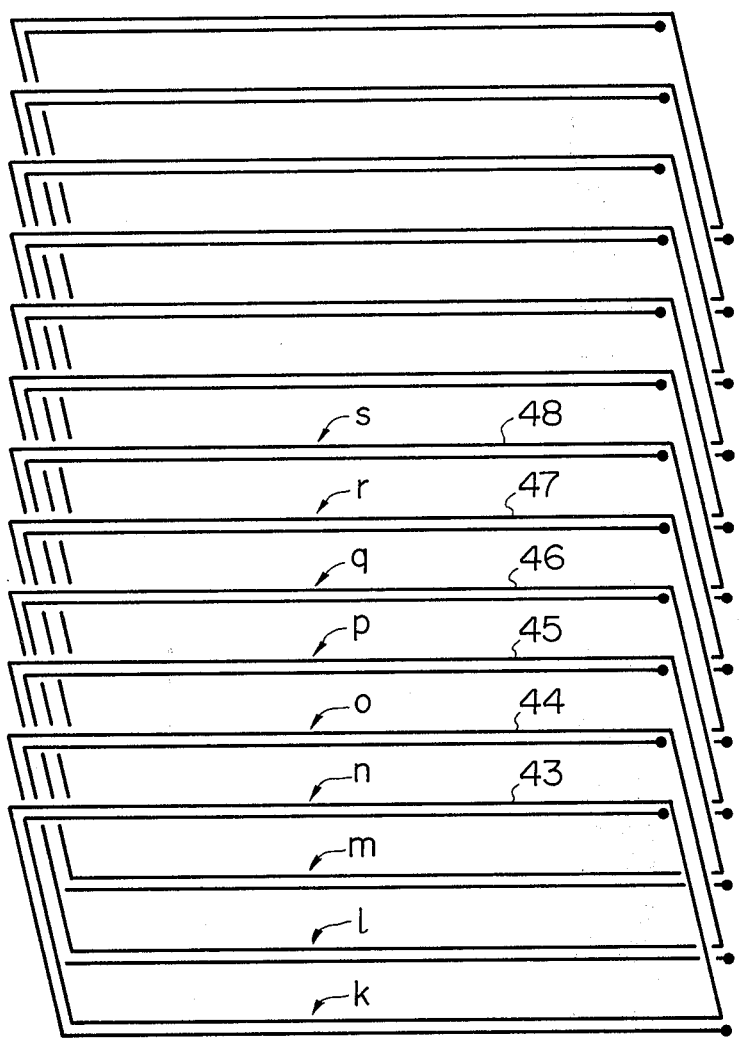
FIG. 13 and FIG. 15 show other ways of arrangement of the conductor loops shown in FIG. 2.
Figure 14:
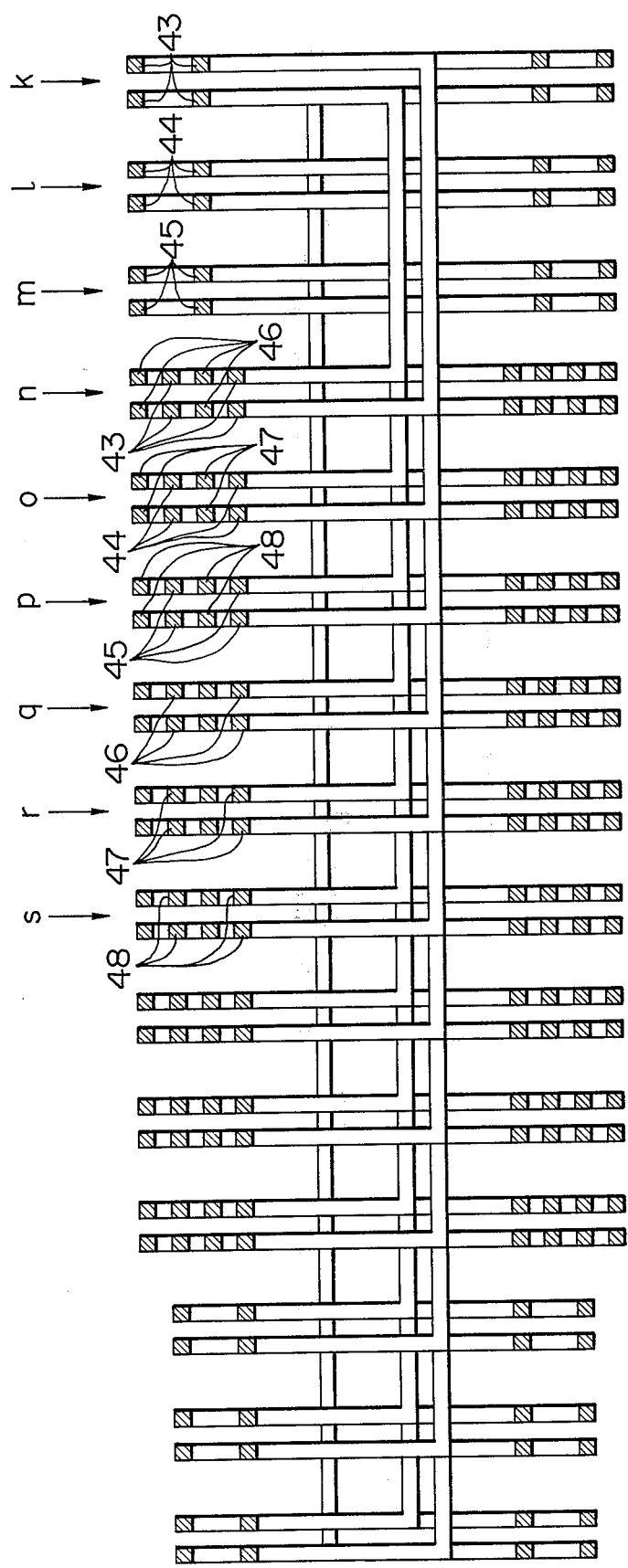
FIG. 14 and FIG. 16 are cross sections of the windings formed of the loops disposed as shown respectively in FIG. 13 and FIG. 15.

Another embodiment of a linear motor winding according to the present invention can be obtained by overlapping such loops as shown in FIG. 2 in such a manner as shown in FIG. 13. It will be seen that in the central part of this arrangement, four of long parts of different loops are located between two long parts of another loop. It will be noted that two of said four long parts are behind the remaining two long parts. Then, the assembly of the loops is rolled twice from the left end (in FIG. 13) about an axis parallel to the plane including the assembly and substantially perpendicular to the long parts so that a linear motor winding as shown in longitudinal cross section in FIG. 14 with inter-loop connection omitted is obtained. The coils of the winding in FIG. 14 are wound in double-layer winding.

Figure 15:
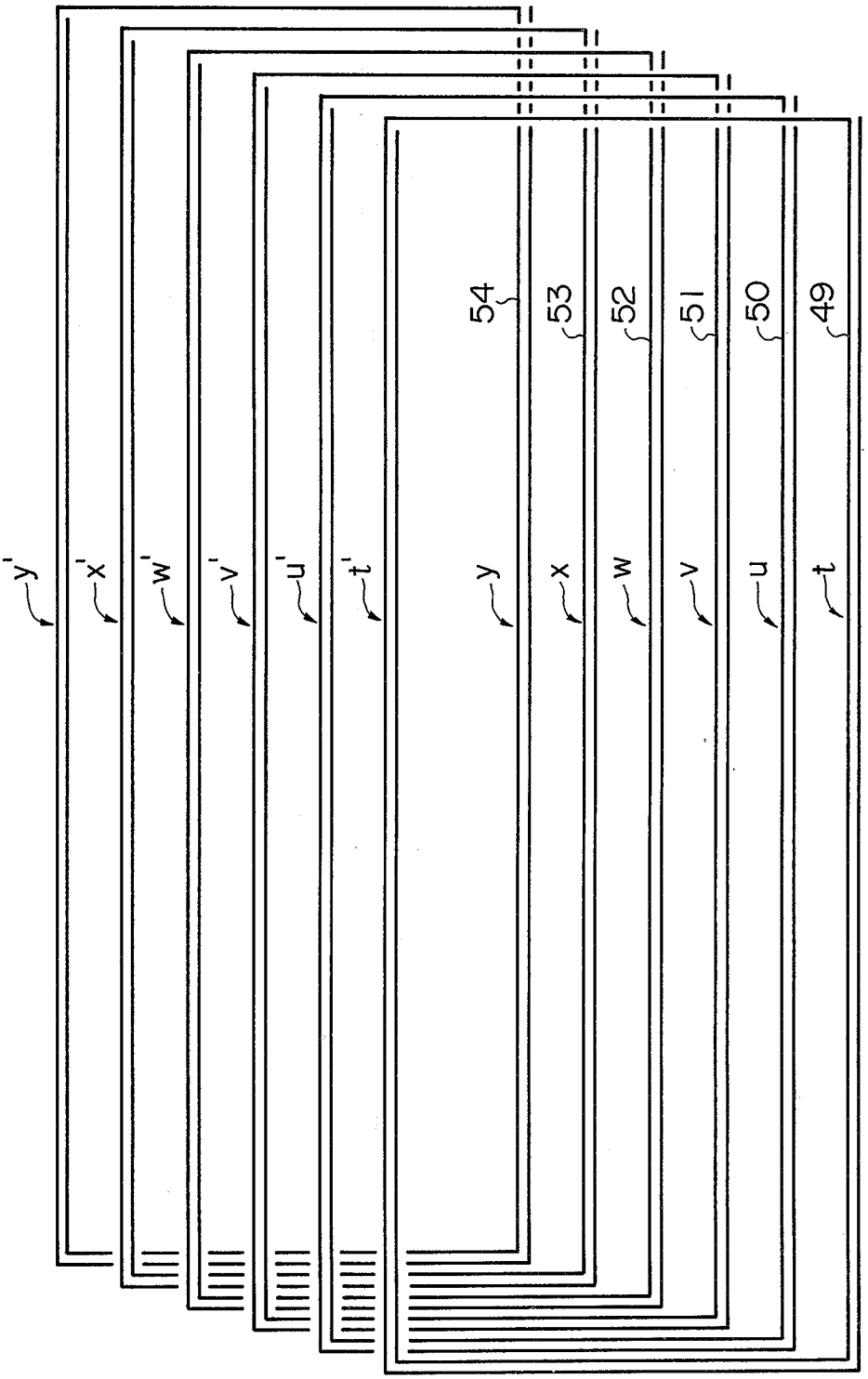
Figure 16:
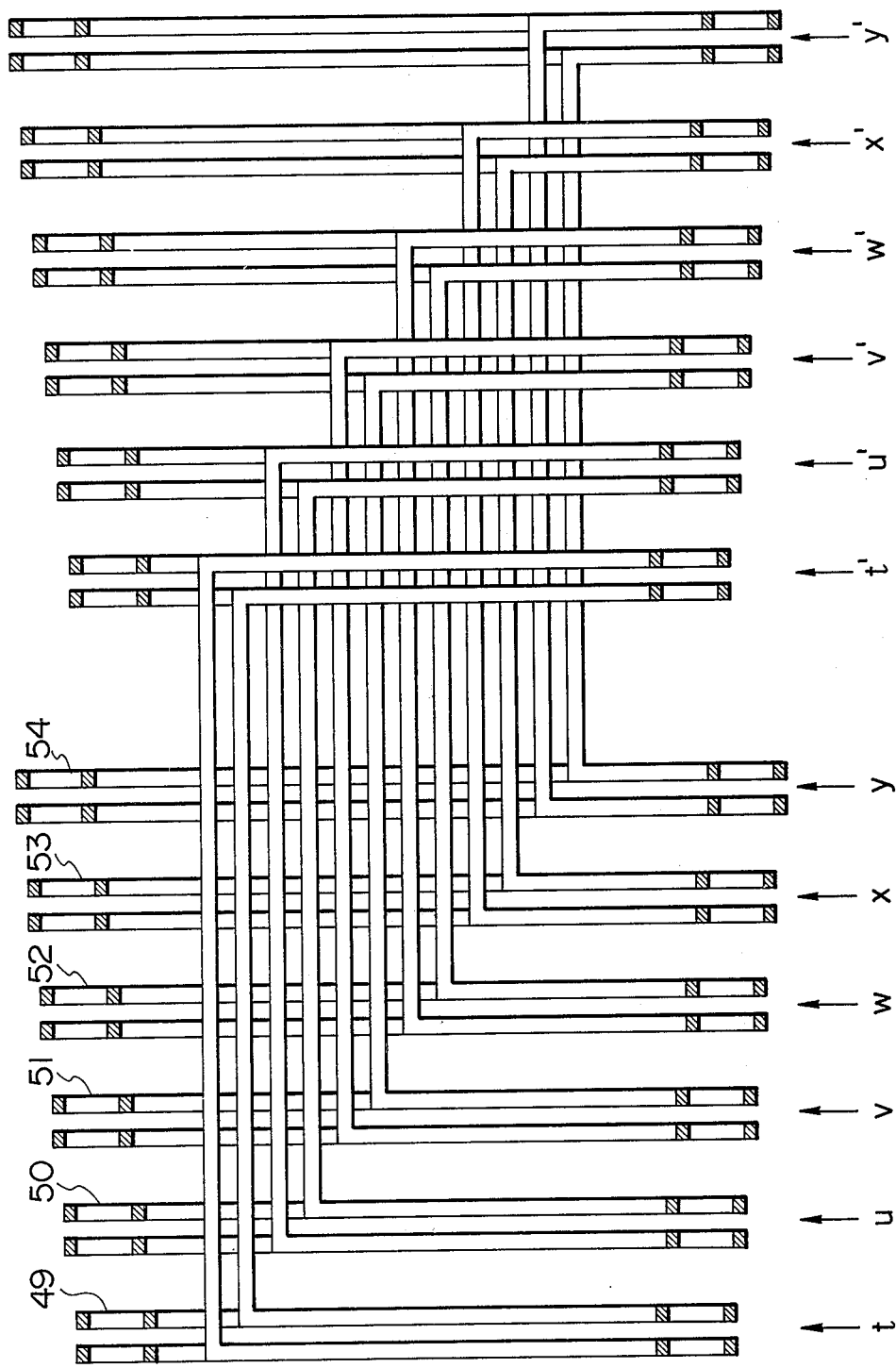

Another embodiment of a linear motor winding according to the present invention can be obtained also by overlapping such loops as shown in FIG. 2 in such a manner as shown in FIG. 15. Then, the assembly of the loops is rolled twice from the left end (in FIG. 15) about an axis parallel to the plane including to the assembly and substantially perpendicular to the long parts so that a linear motor winding as shown in longitudinal cross section in FIG. 16 with inter-loop connections omitted is obtained. In this winding, a continuous conductor wire is coiled to form a unit of two coils connected in series. The coils of the winding are wound in one-way winding.

Figure 17:
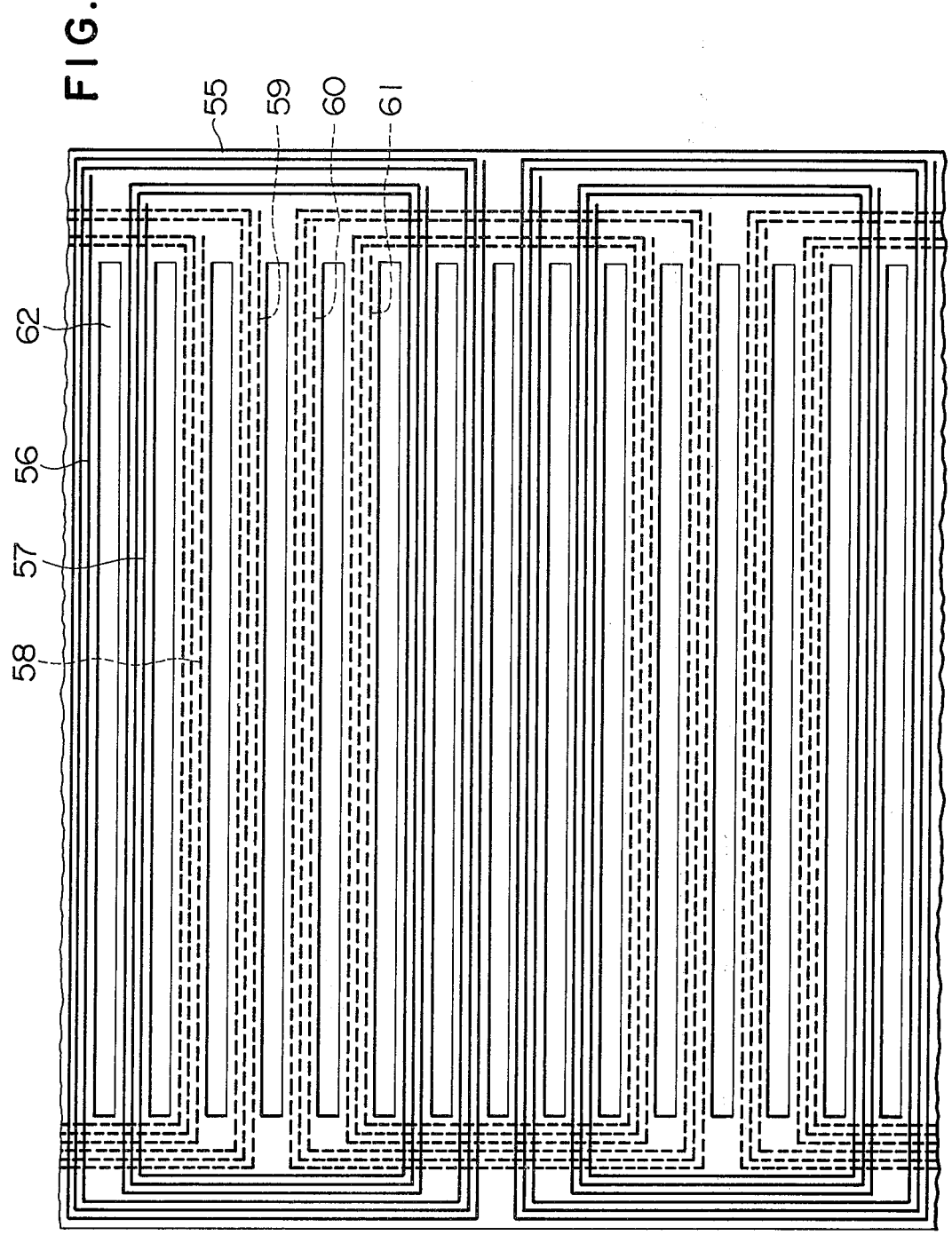
FIG. 17 and FIG. 18 show an arrangement of the loops and a cross section of a winding as another embodiment of the present invention.
Figure 18:
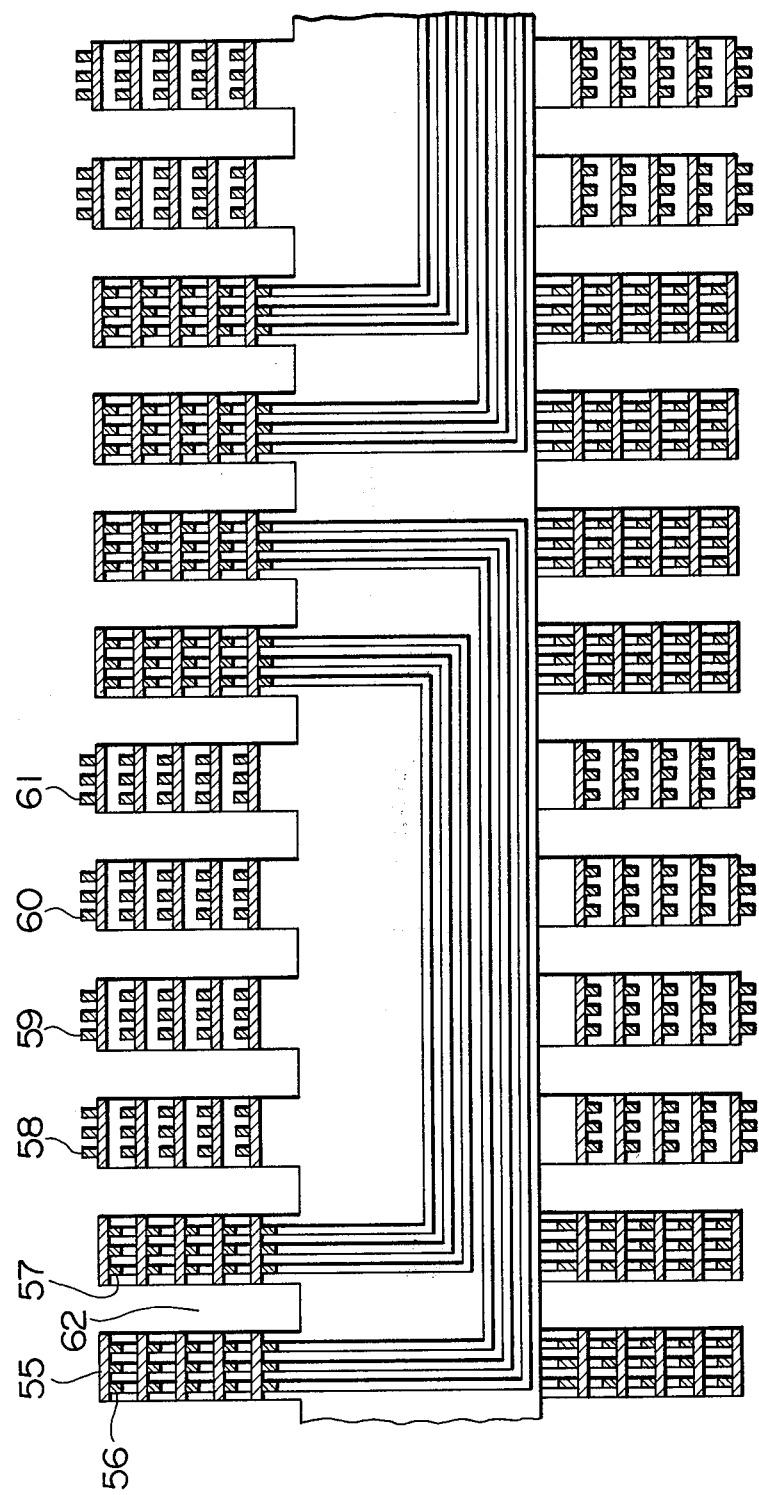

FIG. 17 shows a part of an embodiment of a linear motor winding according to the present invention, in which conductor wires are disposed on both the surfaces of an insulating film 55, solid lines representing conductor wires on the front surface and broken lines conductor wires on the rear surface. In this structure, each long part of a conductor loop having two parallel long parts consists of three conductors. This structure is fundamentally the same as that shown in FIG. 3 and it may be considered that a loop in FIG. 3, say, the loop 1 corresponds to two loops 56 and 57 in FIG. 17. Openings 62 are formed in the insulating film between the long parts of the loops, and magnetic materials to serve as magnetic paths are fitted in the openings. The electrical wiring of the loops as well as the conductors constituting the loops may be performed through printed circuit techniques. Then, the assembly of the insulating film, the magnetic materials and the loops are rolled fivefold from the left end (in FIG. 17) about an axis parallel to the plane including the assembly and substantially perpendicular to the long parts of the loops so that a linear motor winding as shown partially in longitudinal cross section in FIG. 18 with inter-loop connection omitted is obtained. Magnetic materials to serve as magnetic paths are inserted in recesses 62 in FIG. 18. It should be noted here that insulation coating has to be provided for the conductor wires where there is a danger of different conductor wires being short-circuited, not only in this embodiment but in the following ones.

Figure 19:
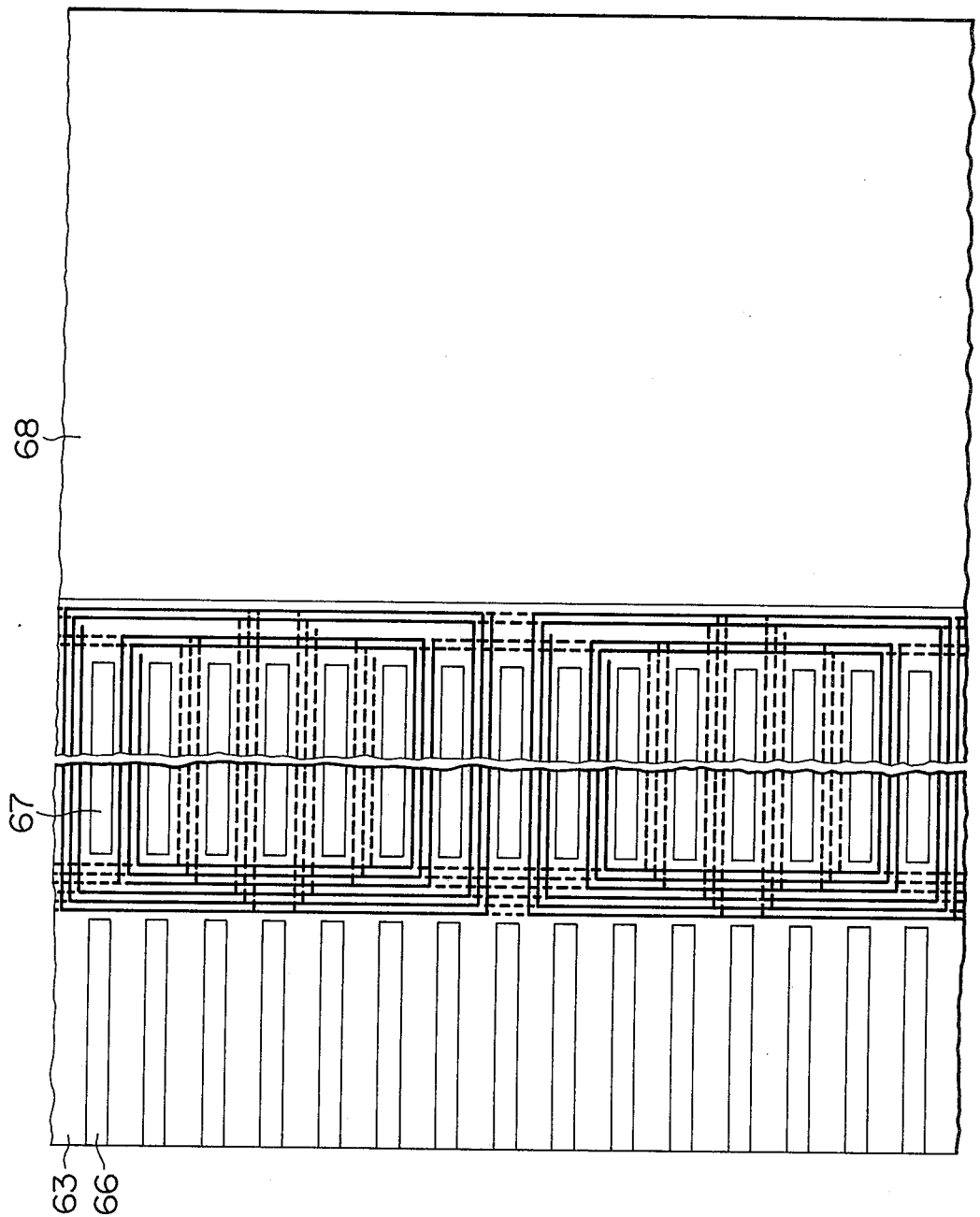
FIG. 19 and FIG. 20 show an arrangement of the loops and a cross section of a winding as another embodiment of the present invention.
Figure 20:
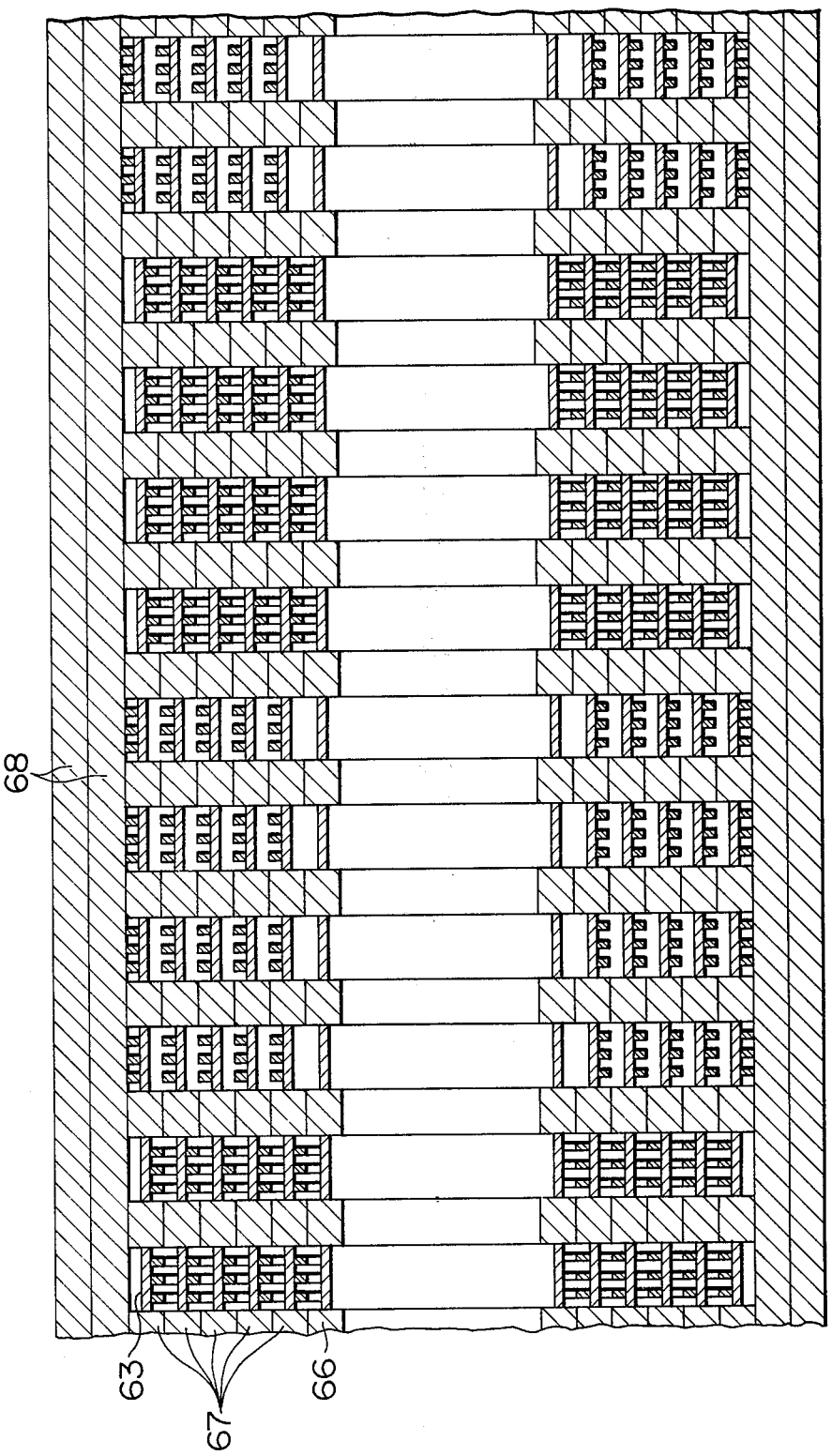

FIG. 19 shows another embodiment of a linear motor winding according to the present invention, which, like that shown in FIG. 17, is adapted for printed circuit techniques and in which loops similar to that shown in FIG. 17 are disposed on both the surfaces of an insulating film 63. In this structure, the strips 66 and 67 of magnetic material and the plates 68 of magnetic material are bound to, embedded in or connected to the insulating film 63. Then, the assembly is rolled fivefold from the left end (in FIG. 19) about an axis parallel to the plane of the film and perpendicular to the long parts of the loops so that a linear motor winding as shown partially in longitudinal cross section in FIG. 20 with inter-loop connections omitted is obtained. In FIG. 20, reference numerals 66 and 67 indicate the embedded magnetic materials and reference numeral 68 designated the connected magnetic material. By increasing the width of each embedded magnetic material 66, the magnetic materials are shaped in semi-closed slot configuration. The coils of the winding in FIG. 20 are concentrically alternate winding.

Figure 21:
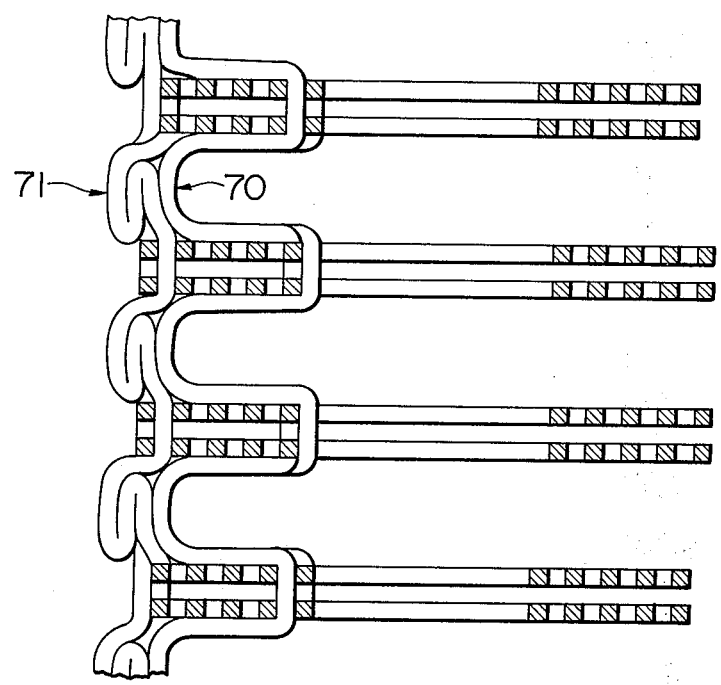
FIG. 21 is a cross section of a part of a winding as another embodiment of the present invention.

Further, the insertion of the magnetic materials between the coils to serve as magnetic paths can be facilitated by increasing the distance between the adjacent loops disposed on the insulation film and the distance between the long parts of each conductor loop and bending outward the elongated part 70 and folding the part 71 after rolling, as shown in FIG. 21.

The shape of the completed winding will be by no means limited to a cylinder but may be of polygonal column.

In the preceding embodiments, the winding of the present invention has been described as applied to a polyphase linear induction motor or linear synchronous motor, but it is a matter of course that the present invention can be applied to a single phase ac linear motor, an ac-dc commutator type linear motor and a brushless linear motor. In the previous embodiments, the technique of the invention has been applied to the primary coils constructed as the outer coils of the motor. However, it will be understood that the same technique is applicable to the primary coils constructed as the inner coils, or further to both of the inner and outer coils if the motor is of the wound secondary type.

Moreover, the ways of winding the coils are not necessarily limited to those mentioned in the above embodiments but any kind of winding may be employed depending upon the case. Further, it will be appreciated that various modifications are likely to occur to those skilled in the art, without departing from the spirit and the scope of the present invention.

I claim:
1. A winding of a linear motor comprising a roll of substantially identical layers of multi-turned loops of a continuous conductor disposed in a plane, each of the loops on the respective layers having a contour including a plurality of long straight parts disposed in mutually parallel and spaced relationship and interconnected at the ends thereof so as to complete the loop, and the loops overlapping in such a manner that the long parts of loops on one layer are laterally displaced from the corresponding parts of loops on another layer.

2. A winding of a linear motor according to claim 1, wherein said loops are provided on both sides of a sheet of insulating material.

3. A winding of a linear motor according to claim 2, wherein said sheet has apertures between adjacent long parts of the loops so as to receive strips of magnetic material.

4. A winding of a linear motor according to claim 2, wherein said sheet has strips of magnetic material between adjacent long parts of the loops so that said magnetic strips serve as magnetic cores for the winding when the sheet is rolled.

5. A winding of a linear motor according to claim 4, wherein a plate of magnetic material is attached to said sheet so that said magnetic plate serves as yoke part for said magnetic cores when said plate is rolled after the rolling of the sheet.

6. A method of fabricating a winding of a linear motor, comprising the steps of:

providing at least one multi-turned loop of a continuous conductor wound along a planar contour, said contour including a plurality of long straight parts disposed in mutually parallel and spaced relationship and interconnected at the ends thereof so as to complete the loop;

assembling at least two of said planar loops by laying one loop on another in such a positional relationship that the long parts of one loop are laterally displaced from the corresponding parts of another loop; and rolling the assembled loops around an axis which is paralled to the planes of said loops and perpendicular to the long parts of the loops so as to form cylindrically disposed loops of conductors.

* * * * *